United States Patent [19]

Chapman

[11] Patent Number: 4,861,093
[45] Date of Patent: Aug. 29, 1989

[54] TAILGATE ASSEMBLY
[76] Inventor: Fred L. Chapman, 18205 N. 25th Pl., Phoenix, Ariz. 85032
[21] Appl. No.: 120,622
[22] Filed: Nov. 13, 1987
[51] Int. Cl.$^4$ .............................................. B62D 25/00
[52] U.S. Cl. ................................. 296/180.1; 296/57.1
[58] Field of Search .......................... 296/50, 57 R, 1 S
[56] References Cited
U.S. PATENT DOCUMENTS

| | | | |
|---|---|---|---|
| 4,165,118 | 8/1979 | Jensen | 296/50 |
| 4,201,411 | 5/1980 | Morgan | 296/50 |
| 4,353,589 | 10/1982 | Hartberg | 296/50 |
| 4,475,759 | 10/1984 | Wine | 296/1 S |

Primary Examiner—Robert R. Song
Attorney, Agent, or Firm—Gregory J. Nelson

[57] ABSTRACT

An improved vented tailgate for use on a pickup truck or similar vehicle having a cargo area with front and side walls and a rear opening. The tailgate is provided with opposite end members which support transversely extending louver members defining downwardly and rearwardly inclined air passageways which permit the passage of air through the tailgate. The air passageways reduce air drag resulting in a substantial increase in fuel efficiency of the vehicle and also serve to deflect dirt and exhaust away from the vehicle. The louvers are formed by hollow tube members to provide a tailgate which is structurally strong to support loads in the open position. The tailgate may be provided as original equipment or be retrofit to the existing latch and hinge mechanisms of the conventional pickup truck. The orientation of the passageways also permit limited rearward vision through the tailgate from the cab of the truck.

9 Claims, 2 Drawing Sheets

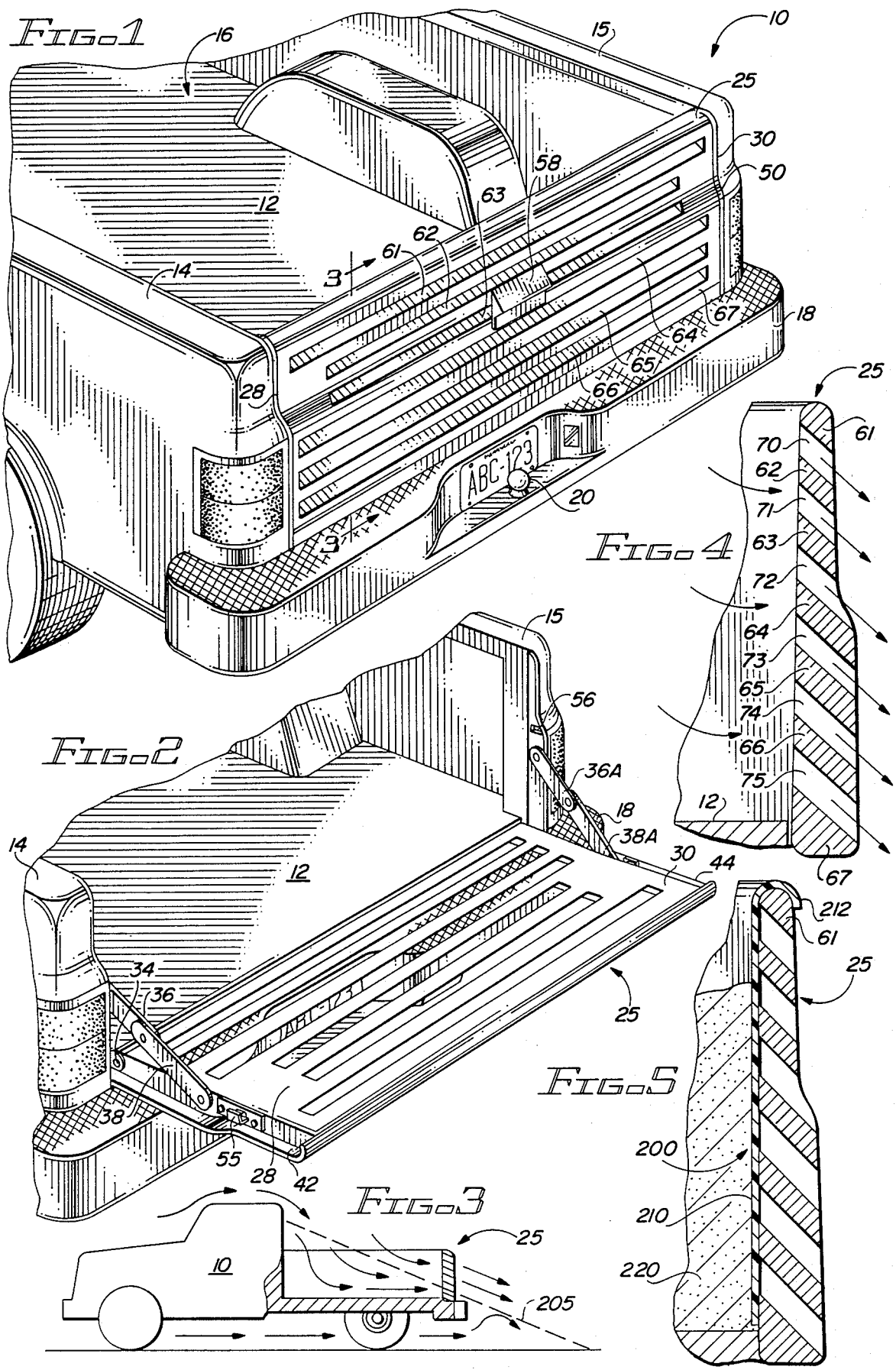

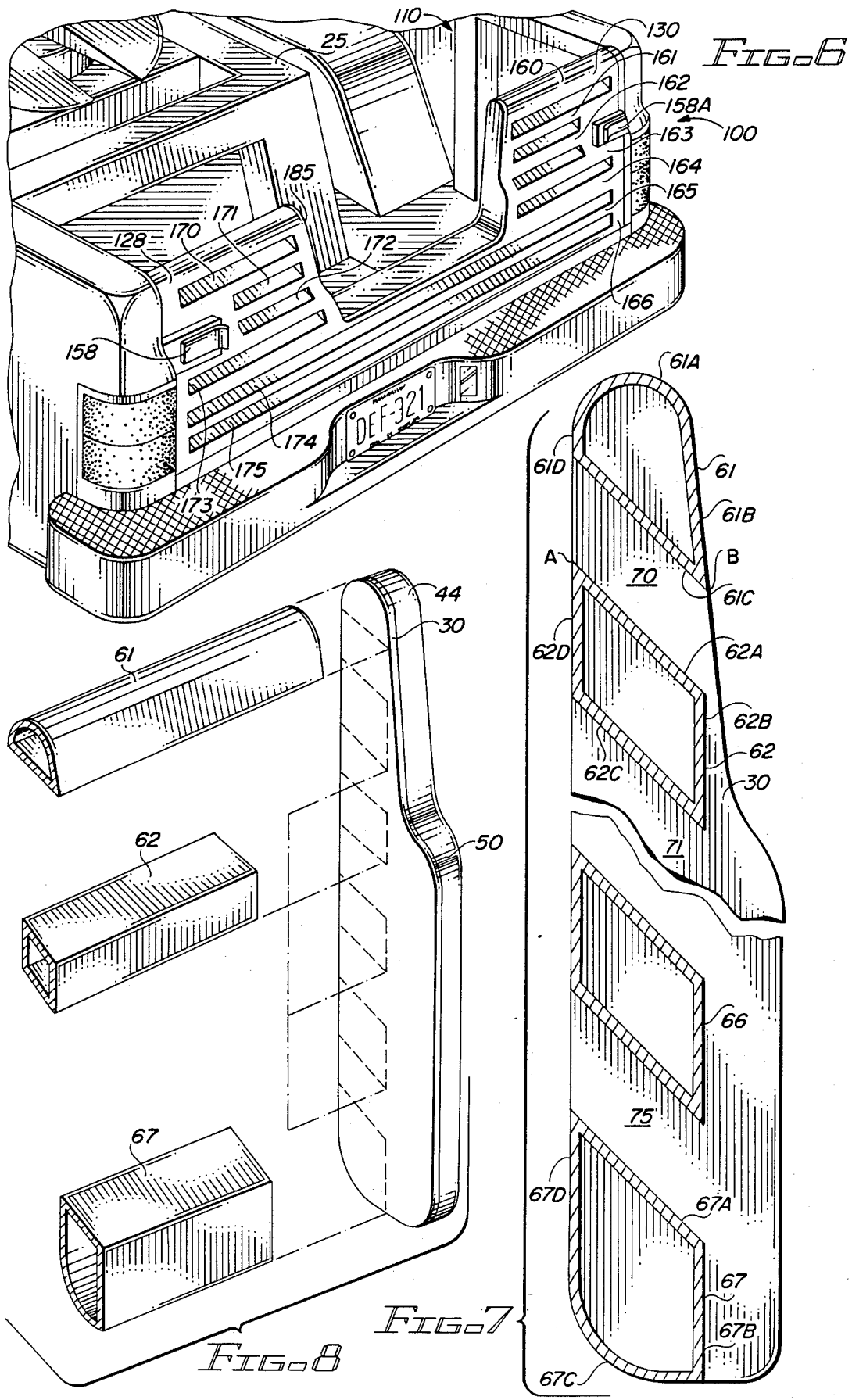

TAILGATE ASSEMBLY

The present invention relates to vehicle tailgates of the type commonly used to access a load space and more particularly to a vented tailgate having fixed louvers defining air passageways to reduce wind resistance resulting in improved fuel economy.

Vehicles such as pickup trucks are generally designed having an open cargo or load space behind the cab for receiving cargo. These vehicles are provided with a tailgate in the form of a panel which is pivotally mounted to the vehicle. When loading and unloading the vehicle, the tailgate is downwardly pivoted to a generally horizontal position. In the normal operating position, the tailgate is locked in a vertical position at the end of the load space between the truck side walls. In the closed position, the tailgate imposes a substantial wind resistance or drag, particularly at higher speeds which resistance substantially lessens the fuel efficiency of the vehicle.

Other disadvantages also result from the conventional tailgate design. The solid tailgate panel imposes a visual barrier to the driver in the cab when the driver is looking rearward, as when backing the vehicle. Thus, operations such as connecting the vehicle to a trailer or other towed vehicle at a hitch on the truck can become difficult because of the inability of the driver to view the trailer hitch from the cab.

Another disadvantage associated with prior art tailgates and cargo construction is due to the air flow beneath the vehicle. The airstream passing under the vehicle normally will tend to be drawn upwardly along the tailgate in the reduced pressure area existing at the rear of the vehicle. The upward movement of air along the tailgate will often bring debris and exhaust gas into the open cargo compartment which can have an extremely undesirable effect on any passengers in the cargo compartment and will also cause dirt and debris to collect in the cargo compartment and on any cargo in the compartment.

There have been various attempts in the prior art to substantially improve conventional tailgate construction to overcome some of the problems discussed above. Various tailgate constructions can be found in the prior art which utilize fixed vents and louvers to reduce air drag.

U.S. Pat. No. 4,136,905 shows a tailgate construction for pickup trucks and other vehicles which has an open frame with a closure member mounted on the open frame with air passages. In one embodiment of the tailgate, the cover is fabricated from expanded metal screening and another embodiment incorporates a moveable shutter arrangement which can be opened to allow air to pass through the tailgate or closed to present a substantially solid surface to cargo.

U.S. Pat. No. 4,353,589 shows a closure device for the rear of a truck which is air permeable. The closure device is an open grid permitting free flow of air through the tailgate to reduce wind resistance and drag.

Various moveable shutter tailgate constructions for pickup trucks and other vehicles are shown in U.S. Pat. Nos. 4,200,328 and 4,201,411. These patents show tailgate constructions for pickup trucks and other trucks having a shutter mechanism for selectively preventing the passage of air through the tailgate when closed and when opened permit the force of air against the shutters to open the shutters. When it is necessary to haul certain types of cargo, the shutters may be locked in their closed position.

Thus, while the prior art suggests certain improved tailgate constructions which permit air to freely flow through the tailgate to eliminate drag, various problems and disadvantages still exist. Many of the prior arrangements, while reducing drag, do not provide sufficient structural integrity so that a load may be placed on the tailgate when the tailgate is in the horizontal or open position. Other of the prior art tailgate constructions are mechanically complex and therefore are expensive and, accordingly, have not achieved wide acceptance. Further, most all of the prior art designs for air permeable tailgates create air flow patterns which will cause dust, debris and exhaust gas to be drawn into the cargo space.

Therefore, it is a principal advantage of the present invention to provide a replacement tailgate construction for the cargo area of pickup trucks and other vehicles which construction has fixed vanes defining air slots which permit the passage of air through the tailgate to reduce wind resistance.

Another object of the present invention is to provide an improved tailgate assembly having fixed louvers oriented to define rearwardly and downwardly inclined air passageways creating an air flow path which tend to rearwardly deflect the air stream coming from beneath the vehicle to minimize collection of debris, dirt, dust and exhaust gases in the vehicle cargo area and reduce drag.

A further object of the present invention is to provide an improved tailgate that results in improved fuel economy for the vehicle.

Another important object of the present invention is to provide a replacement tailgate construction having openings oriented so that the driver looking rearwardly from the cab is provided at least a partial view of the area directly adjacent the rear of the vehicle.

Still a further object is to provide a vehicle tailgate design which is aesthetically pleasing.

The above and other objects of the invention will become readily apparent from the following description when read in conjunction with the accompanying drawings wherein like numerals are used to identify the same or similar elements in the several views of the drawings in which:

FIG. 1 is a rear perspective view of a pickup truck with the tailgate of the present invention installed thereon and shown in a closed position;

FIG. 2 is a view similar to FIG. 1 with the tailgate of the present invention in an open position;

FIG. 3 is a pictorial view of a pickup truck illustrating the air flow paths around the vehicle with the present invention;

FIG. 4 is a pictorial view of the tailgate of the present invention showing the air flow through the tailgate;

FIG. 5 is a cross-sectional view of the tailgate with a removable barrier installed at the front side of the tailgate;

FIG. 6 is a perspective view of another embodiment of the tailgate of the present invention;

FIG. 7 is a cross-sectional view of the tailgate assembly taken along lines 7—7 of FIG. 1; and FIG. 8 is an exploded perspective view of a portion of the tailgate.

Referring to the drawings, the present invention is designed for use on a vehicle such as a pickup truck 10 having a forwardly mounted cab and a rearwardly extending bed 12 having opposite longitudinally extending side walls 14 and 15 which define an open cargo area 16. A bumper 18 extends across the rear of the cargo area and is provided with a hitch 20 for attachment to a towed vehicle.

The improved tailgate of the present invention is generally designated by the numeral 25 and extends transversely across the end of the cargo area 16 and, as is conventional, is hingedly mounted so that the tailgate 25 may be moved between a horizontal open position (FIG. 2) permitting access to cargo area 16 and a generally vertical or closed position (FIG. 1) which provides a barrier at the rear of the cargo area to retain cargo within the compartment.

The tailgate 25 of the present invention may be provided either as original equipment at the time of manufacture of the vehicle or may be provided as an after market replacement unit for the original solid panel tailgate.

The tailgate 25 as best seen in FIGS. 1 and 2 includes a frame having pair of spaced apart, parallel end members 28 and 30. Members 28 and 30 are spaced apart a horizontal distance approximately corresponding to the horizontal distance between sides 14 and 15 at the rear opening of the cargo area.

The lower end of each of the end members 28 and 30 is provided with a hinge 34 which pivotally connects the frame to the tailgate mounting brackets on the truck. It will be understood that the hinge arrangement may be made to be different for different types of trucks and the hinge 34 is representative of the various types manufactured. For example, General Motors Corporation manufactures a standard hinge which utilizes a slotted cylindrical connector so that the tailgate can be removed without having to remove the hinge assembly securing the tailgate to the truck. A pair of folding links 36 and 38 are together at their inner ends. The opposite, outer end of link 36 is pivotally connected to the side wall 14 of the truck. The opposite, outer end of link 38 is pivotally connected to vertical end member 28. A similar link arrangement 36 and 38A extends between opposite side wall 15 and tailgate end member 30. As is conventional the links fold or collapse when the tailgate is moved to the closed position, occupying a generally vertical position at opposite sides of the tailgate. When the tailgate is open, the links will extend to the position shown in FIG. 2 to support the tailgate in a generally horizontal position for access to the cargo area and to permit the tailgate to support a load.

Flange members 42 and 44 extend respectively from each of the end members 28, 30 forming a lip generally coextensive with the end members. Thus, a lateral space exists at either end of the tailgate and is occupied by the link assemblies, pivot hinge 34 and lock 55. From the rear exterior of the truck, the lip or flanges 42, 44 obscure these components from view. Preferably, as seen in FIG. 7, the exterior flanges 42, 44 are vertically contoured to generally correspond to the configuration of the side walls 14 and 15 of the truck. For example, with the truck shown, the flanges extend outwardly in area 50 to conform to the tail light area at either side wall.

The construction of the tailgate is best seen in FIGS. 1, 2 and 7. The opposite end members 28 and 30 are interconnected by a plurality of transversely extending louvers 61, 62, 63, 64, 65, 66 and 67. The top louver 61 extends at an elevation generally corresponding to the elevation of the top of the truck side walls although the overall height of the tailgate assembly may, in some instances, be either greater or less than the height of the truck side walls. The top louver 61 is in the form of a hollow tube having a generally arcuate upper surface 61A, vertical rear surface 61B, and vertical front surface 61B. The terms "front" and "rear" are relative and refer to an orientation corresponding to the front and rear of the truck. Walls 61B and 61D are typically spaced apart from one another a distance of between 1½ and 2 inches. Louver member 61 is completed by transversely extending bottom surface 61C which is rearwardly inclined forming an angle of approximately 45° with horizontal as seen in FIG. 7.

Fixed louver member 62 extends transversely between the end members 28 and 30 and is parallel to louver 60. Tube 62 is hollow formed having opposite front and rear walls 62B and 62D in general vertical alignment with walls 61B and 62D, respectively. The upper surface 62A of tube 62 is rearwardly inclined at an angle of approximately 45° with respect to the horizontal so that an air slot or passageway 70 is defined between the adjacent tubes. Passageway 70 extends substantially across the width of the tailgate between end members 28 and 30 and is defined by rearwardly inclined surfaces 61C and 62A so that when the vehicle is driven in a forward direction, air flow which would normally impact on the tailgate will be allowed to pass through the passageway 70 and be deflected downwardly toward the roadway surface on which the vehicle is traveling, as best seen in FIGS. 3 and 4.

Additional transverse louvers 63 through 67 extend between the end members 28 and 30 defining air passageways 71 thru 75. All the passageways extend generally transversely across the width of the tail gate and are defined by opposite louver surfaces which serve to direct the air flow through the passageway, downwardly at an approximate 45° angle.

Bottom transverse louver 67 is formed as a hollow tube member having the upper inclined surface 67A which defines one side of the lower most air passageway 75. The opposite front and rear side walls 65D and 65B are generally vertical and disposed and spaced apart a predetermined distance consistent with the spacing of tubes 61 to 64. A bottom wall 75D is preferably arcuate to provide clearance for opening and closing the tailgate. The tailgate louvers 61 to 67 are preferably constructed by welding from any suitable steel plate such as 16 guage plate. The resulting tailgate is structurally strong being, in effect, a series of parallel beams joined at their ends. The use of the hollow louvers provides strength and light weight. The inner side of the tailgate is planar for easy loading and temporary storage of articles when in an open, horizontal position.

An appropriate latch member 56 is provided at the opposite truck side walls and is cooperative with a lock mechanism 55 associated with the tailgate for holding the tailgate in a closed position. The locking mechanism 55 cooperates with the latch members 56 to secure the tailgate closed. A release 58 is provided on the tailgate so that the tailgate may be moved to the open horizontal position. The construction of the latch and locking members varies with different vehicle models and the particular construction will accordingly be made to conform to the construction of the vehicle. The release mechanism 58 is positioned at an intermediate location on the exterior of the tailgate at a convenient height as is conventional. The release operates the lock mechanism 55 at the opposite side plates which can be engaged or disengaged with the conventional tailgate latch members described above.

It is further noted with the tailgate of the present construction, the tailgate can be easily and conveniently retrofit replacing conventional tailgates. The construction of the tailgate of the present invention is lighter than most conventional tailgates so the replacement operation can normally be accomplished by a single individual. The vented tailgate of the present invention can be provided to the truck user in any particular color or may be simply provided with a protective coating which then may be painted by the truck owner or operator to match the exterior of the vehicle. Because of the aesthetically pleasing appearance of the louvered tailgate, the tailgate will also have appeal to custom vehicle applications and in such cases may be plated with chromium.

It will thus be seen that with the tailgate as shown in FIGS. 1, 2 and 4, the tailgate has substantial transversely extending air passageways or openings through which air may pass. The size, location and area occupied by these passageways may vary substantially, but generally the air passages comprise at least approximately 30%–45% of the overall surface of the tailgate. Since the tailgate is comprised of louver members extending between the end members, the resulting tailgate is dimensioned to closely correspond to the conventional tailgate and is structurally equivalent to the conventional tailgate and will support loads on the inner surface of the tailgate when in an open, generally horizontal position.

The tailgate constructed in accordance with FIGS. 1 and 2 was installed on a 1986 three-quarter ton Chevrolet pickup truck and subjected to road tests in which a wide range of driving, wind, load and weather conditions were experienced. The tailgate was provided with six transverse air passageways generally downwardly inclined at approximately 45° with respect to horizontal with the tailgate in the closed position. The total area of the tailgate occupied by the air passageways was approximately 30%. The test indicated that the overall increase in fuel efficiency ranged from a low of 9% to a maximum of approximately 23% over the wide range of driving conditions.

In addition to the foregoing, another significant advantage of the tailgate construction of the present invention resides in the orientation of the air passageways. The effectiveness of these passageways 70 to 75 in preventing accumulation of dust, dirt, debris, and exhaust fumes in the cargo area is illustrated in FIG. 3. It will be seen that when the truck 10 is moving forward, an air flow path is established over the top of the cab and along the bed of the pickup truck impacting the tailgate 25 in the vertical, closed position. Normally the impact of this airstream on the tailgate would impose a substantial resistance being reflected in substantially reduced fuel efficiency. However, with the tailgate of the present invention, substantial air passageway areas are provided in the tailgate allowing the air to pass through the tailgate to the rear of the truck. Further, the air passageways are oriented to deflect the air flow downwardly towards the roadway surface on which the truck is traveling. The overall effect of the vented tailgate is to increase fuel efficiency substantially. Also, the downwardly directed air flow also reduces the drag effect imposed by any towed vehicle or trailer.

Another important advantage achieved by the tailgate of the present invention is the effect on the airstream which passes beneath the vehicle. As indicated in FIG. 3, this airstream passes beneath the vehicle and normally due to the vacuum existing at the rear of the vehicle, will tend to be drawn upwardly and as it does so will bring dust, dirt, debris and exhaust gases with it. These are often caused to enter the cargo area of the pickup truck may present health hazards to passengers in the bed of the truck and will also become deposited on any cargo. However, with the tailgate of the present invention, the airstream exiting from the air passageways in the tailgate is directed downwardly forcing the air stream that exits from beneath the truck and the contaminates carried with it downwardly and away from the truck.

FIGS. 3 and 7 also illustrate another important advantage of the present invention. It will be noted, for example, that the construction of the louvers is such that the upper-most point on the lower inside wall defining one side of a passageway approximately horizontally aligns with the lower-most point on the inclined surface of the next superjacent wall. For example, looking at FIG. 7 it s seen that point A at the front side of the tailgate or louver 62 is horizontally aligned with point B at the rear side of the tailgate or louver 61. Thus, this arrangement provides some security as visual access to the cargo area is restricted from an eye level height along the tailgate. However, as indicated in FIG. 3, the driver in the cab is elevated to a position that when the driver turns and looks rearwardly and downwardly, the driver's visual line of sight (LOS) generally corresponds to the angularity of the air passageways providing at least a partial view of the area at the rear of the truck through the passageways in the tailgate 25. Thus, when the driver is backing the truck up or performing an operation such as connecting a hitch 20 to a towed vehicle, at least a partial view is provided for convenience and safety.

Another embodiment of the tailgate construction of the present invention is illustrated in FIG. 6 and is generally designated by the numeral 100. Tailgate 100 is similar to tailgate construction 25 and is hinged to close the tailgate opening at the rear end of the cargo compartment of a pickup truck 110. The principal difference is that the tailgate construction 100 is adapted for use with fifth-wheel trailer arrangements in which a fifth-wheel 125 is mounted in the bed of the truck for attachment to a tongue-mounted king pin extending to the towed trailer. In this embodiment, the tailgate 100 is again constructed having opposite end frame members 128 and 130 which are interconnected by transversely extending louver members 160 through 165 which define a plurality of transversely extending air passageways 170 to 175. As described previously, the tubes are configured having adjacent surfaces at either side of the air passageways which are rearwardly and downwardly inclined to deflect the air flow through the tailgate downwardly. The tailgate is provided with link mechanisms to allow the tailgate to be supported in the generally horizontal position when opened. In order to reduce the wind resistance, latch handles 158 and 158A are provided adjacent either side of the tailgate to operate the latching mechanism to release the latch from the tailgate catch members so that the tailgate can be opened.

The upper edge of the replacement tailgate is provided with a large generally V-shaped recessed area 185 at a generally centrally located position. This recess area allows the tongue of the fifth-wheel trailer to pass through the area normally occupied by the tailgate. In other respects, the tailgate of embodiment 100 is generally constructed as has been described with reference to previous figures.

In some instances, the user of the pickup truck will haul such as sand, grain and other granular or particulate material. Accordingly, as shown in FIG. 5, a closure or barrier 200 may be imposed at the front or inside of the tailgate 25 closing the air passageways to prevent escape of finer material through the passageways. The closure member 200 includes a body 210 which consists of a generally rectangular panel approximately corresponding to the rectangular dimensions of the tailgate. The upper edge of the body is provided with one or more arcuate hooks or hangers 212 which are adapted to engage the upper tube 61 of the tailgate assembly. The barrier is placed in position against the front face of the tailgate and supported by the hangers 212 along the upper edge of the tailgate. The panel serves to close-off the air passageways to prevent escape of material 220 from the truck bed. The panel will assume a vertical position against the inside of the tailgate and force of wind against the tailgate or the pressure exerted by any granular or particulate material 200 against the tailgate will also serve to hold the panel against the tailgate, preventing escape of these materials. When the barrier is not required, it can be simply lifted from the tailgate and stores in a convenient location.

In summary, it is seen that the present invention provides a unique tailgate construction which significantly reduces air drag imposed by the tailgate and further serves to allow the driver limited visibility through the tailgate. Further, the tailgate is structurally superior to prior art tailgates which are vented or are provided with apertures for the passage of air. A further significant advantage of the present invention is that the tailgate serves to deflect air flow in a manner to reduce dirt, dust, exhaust and other contamination from entering the cargo area.

It will be obvious to those skilled in the art to make various changes and modifications to the tailgate construction described herein. To the extent these various changes and modifications do not depart from the spirit and scope of the appended claims, they are intended to be encompassed therein.

I claim:

1. A tailgate pivotally mountable in the access opening of the cargo area betwen the side walls of a pickup truck bed having a floor, said tailgate comprising:

(a) a frame having a plurality of spacedapart louver members, said louver members each having a front side and rear side and at least one louver having a first surface inclined rearwardly and downwardly between said sides which together with a similarly oriented second surface on the next adjacent louver member define an air passageway for directing airflow downwardly toward the roadway surface; and (b) hinge means for securing said frame to the bed whereby the frame is moveable relative to the access opening between a closed vertical position between the truck bed side walls and an open position generally co-planar with the truck bed floor with said front side of said louvers defining a generally planar load bearing surface.

2. The tailgate of claim 1 wherein said frame is generally rectangular having a top, bottom and side edges with said top edge defining a recess therein to accomodate a fifth wheel tongue.

3. The tailgate of claim 1 further including a barrier panel detachably securable to the front said of said frame to substantially cover said air passageway.

4. The tailgate of claim 1 wherein said louver members are generally horizontally extending hollow members.

5. The tailgate of claim 1 further including latch means for selectively latching said tailgate in said closed position.

6. The tailgate of claim 1 wherein said rear side of said louvers at least partially conforms to the contour of the adjacent truck side walls.

7. The tailgate of claim 1 wherein said lowest point on the said first surface of said one louver member is substantially horizontally aligned with the highest point on the second surface of the next subjacent louver member when the tailgate is in a closed generally vertical position.

8. The tailgate of claim 1 wherein said first and second surfaces are rearwardly inclined at approximately 45° with respect to the horizontal when said tailgate is in a vertical closed position.

9. The tailgate of claim 1 wherein at least a part of the rear side of said one louver is substantially horizontally aligned with at least a part of the front side of the next adjacent louver.

* * * * *